United States Patent [19]

Young

[11] Patent Number: 4,660,642

[45] Date of Patent: Apr. 28, 1987

[54] HIGH STRENGTH, CHEMICAL RESISTANT PARTICULATE SOLIDS AND METHODS OF FORMING AND USING THE SAME

[75] Inventor: Bill M. Young, Duncan, Okla.

[73] Assignee: Halliburton Company, Duncan, Okla.

[21] Appl. No.: 792,096

[22] Filed: Oct. 28, 1985

[51] Int. Cl.$^4$ .................... E21B 43/04; E21B 43/267; B05D 7/00

[52] U.S. Cl. .................... 166/280; 166/278; 166/293; 427/215; 427/221; 428/405

[58] Field of Search ............... 166/280, 278, 276, 293, 166/308, 295; 428/403, 405, 406; 427/221

[56] References Cited

U.S. PATENT DOCUMENTS

| | | | |
|---|---|---|---|
| 3,199,590 | 8/1965 | Young | 166/295 |
| 3,297,087 | 1/1967 | Spain | 166/295 |
| 3,316,966 | 5/1967 | Dear, Jr. | 166/295 |
| 4,042,031 | 8/1977 | Knapp | 166/276 |
| 4,231,428 | 11/1980 | Needham et al. | 166/280 |
| 4,336,284 | 6/1982 | Wallace | 428/405 X |
| 4,576,888 | 3/1986 | Miyakawa et al. | 428/405 X |
| 4,585,064 | 4/1986 | Graham et al. | 166/280 X |

Primary Examiner—Stephen J. Novosad
Attorney, Agent, or Firm—Robert A. Kent; Clark Dougherty; Ed Sherer

[57] ABSTRACT

High strength, chemical resistant particulate solids are provided which are particularly suitable for use in treating subterranean zones penetrated by well bores such as for forming gravel packs, as fracture propping agents and as cement composition structural fillers. The high strength, chemical resistant particulate solids are formed by coating solids with the reaction product of an organofunctional silane and an aryl acid halide.

6 Claims, 2 Drawing Figures

HIGH STRENGTH, CHEMICAL RESISTANT PARTICULATE SOLIDS AND METHODS OF FORMING AND USING THE SAME

BACKGROUND OF THE INVENTION

1. Field of the Invention

The present invention relates to high strength, chemical resistant particulate solids which are particularly suitable for use in treatments carried out in subterranean formations penetrated by well bores.

2. Description of the Prior Art

Particulate solids of various kinds, and particularly sand, are utilized routinely in carrying out production stimulation treatments in subterranean formations penetrated by well bores. For example, particulate solids are used for forming gravel packs adjacent the well bores, for propping open fractures formed in the subterranean formations, as structural fillers in cement compositions utilized in the well bores and formations, etc. The formation of a gravel pack adjacent a well bore penetrating a producing formation causes migrating solids from produced fluids to be screened out of the fluids thereby preventing plugging of flow passageways, damage to tubular goods and other equipment, etc. In carrying out treatments in subterranean formations whereby fractures are created in the formations to create flow channels therein, particular solid propping agents are commonly placed in the fractures to prevent their closure after fracturing fluid pressure reduction. A variety of other treatments and procedures are carried out in well bores and subterranean formations penetrated thereby using cement compositions which include particulate solid structural fillers.

In most of the applications for particulate solids in well bores and subterranean formations, the particulate solids are subjected to high overburden pressures and high temperatures which cause the particulate solids to be crushed and/or rapidly chemically deteriorated. For example, propping agents utilized in deep wells are often crushed by the high overburden pressures exerted thereon causing partial closure of the fractures which reduces produced fluid flow therethrough. The mixture of crushed and non-crushed propping agent remaining in the fractures has a greatly reduced permeability which results in an additional reduction in fracture flow capacity and hydrocarbon production.

Propping agent and gravel pack solids placed in relatively deep wells are subjected to increased aqueous hydrolysis deterioration at the high temperatures encountered, especially in the presence of steam. Flaws and weakened segments in the particulate solid surfaces such as microfractures and pinholes accelerate such aqueous hydrolytic deterioration.

Particulate solids utilized heretofore tend to craze and/or fragment during shipment and/or placement whereby the solids become more rounded and fines are accumulated therewith. This in turn results in reduced solids interface permeabilities and flow properties.

Thus, there is a need for particulate solids which have increased resistance to structural and chemical deterioration in high temperature environments. By the present invention, such high strength, chemical resistant particulate solids are provided as well as methods of forming and using the solids.

SUMMARY OF THE INVENTION

A method of increasing the resistance of particulate solids to structural and chemical deterioration and forming high strength, chemical resistant particulate solids therefrom is provided. The method comprises coating the solids with the reaction product of an organofunctional silane and an aryl acid halide. A high strength, chemical resistant particulate solid product formed in accordance with the method and methods of using the particulate solids product are also provided.

DESCRIPTION OF PREFERRED EMBODIMENTS

Figure 1:
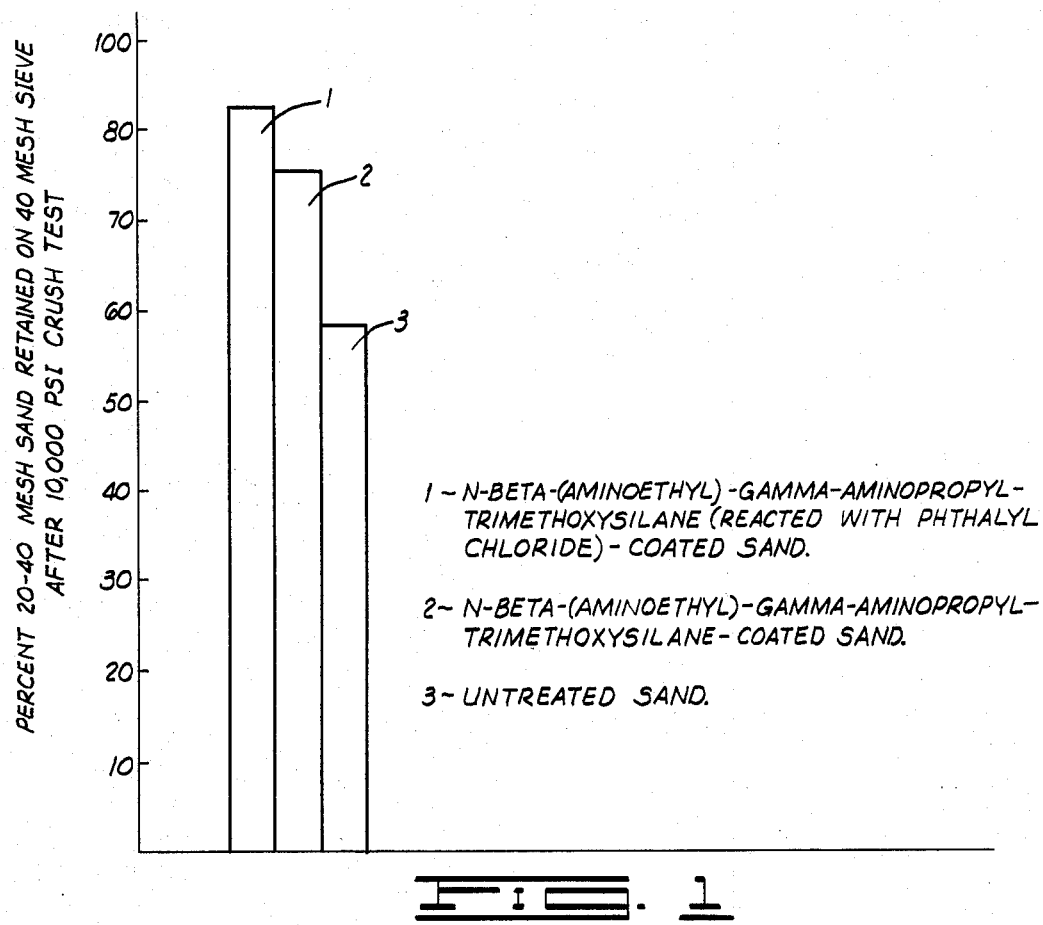
FIG. 1 is a bar graph showing the results of 10,000 psi crush tests on sand treated in accordance with the methods of the present invention as compared to other sands.

The resistance of particulate solids to structural and chemical deterioration is increased whereby high strength, chemical resistant particulate solids particularly suitable for use in subterranean formation treatments result. More specifically, particulate solids of the type normally used in high temperature and high pressure applications such as sand, sintered bauxite, silica alumina, glass beads, etc., are utilized as starting materials. The structural and chemical deterioration resistance of such particulate solids is increased whereby a high strength, chemical resistant particulate solids product is formed therefrom. The increase in structural strength and chemical deterioration resistance is brought about by coating the solids with the reaction product of an organofunctional silane and an aryl acid halide.

Preferred organofunctional silanes are those which contain two or more organofunctional groups capable of reacting with aryl acid halides. The silane compounds also must possess one or more groups which are capable of chemically bonding with the surfaces of the coated particulate solids. Examples of such organofunctional silanes are those selected from the group consisting of aminofunctional silanes, ureidofunctional silanes and epoxyfunctional silanes. Examples of aminofunctional silanes which are particularly suitable are gamma-aminopropyltriethoxysilane $[H_2N(CH_2)_3Si(OC_2H_5)_3]$, N-beta-(aminoethyl)-gamma-aminopropyltrimethoxysilane $[H_2N(CH_2)_2NH(CH_2)_3Si(OCH_3)_3]$, and aminoethyl-N-beta-(aminoethyl)-gamma-aminopropyltrimethoxysilane $[H_2N(CH_2)_2NH(CH_2)_3NH(CH_2)_3Si(OCH_3)_3]$. An example of a particularly suitable ureidofunctional silane is gamma-ureidopropyl-triethoxysilane

Examples of particularly suitable epoxyfunctional silanes are beta-(3-4-epoxy-cyclohexyl)ethyltrimethoxysilane

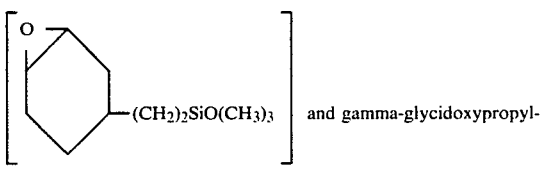 and gamma-glycidoxypropyl-trimethoxysilane 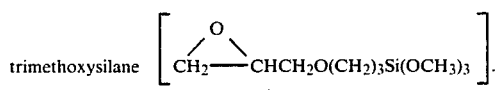.

Particularly suitable aryl acid halides for use in accordance with the present invention are those derived from phthalic acids containing two or more acid chloride groups.

Examples of such compounds are phthaloyl chloride

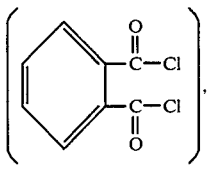, isophthaloyl chloride 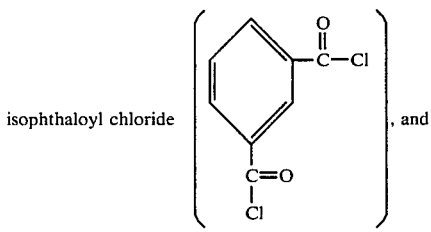, and terphthaloyl chloride 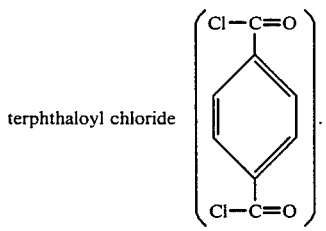.

The reaction of organofunctional silanes and aryl acid halides of the type described above produces a hard highly crosslinked copolymeric structure. The interaction of the halides occurs through the organofunctional groupings, e.g., amino groups leaving the silicone ester groups available for forming chemical bonds with the substrate surface of the particulate solids. Organofunctional silanes having multiple reactable functional groups produce the greatest crosslinking when reacted with aryl acid halides having multiple acid halide groups. For example, aminoethyl-N-beta-(aminoethyl)-gamma-aminopropyltrimethoxysilane is more reactive than N-beta-(aminoethyl)-gamma-aminopropyltrimethoxysilane which is more reactive than gamma-aminopropyltriethoxysilane.

When particulate solids of the type described above are coated with the reaction product of an organofunctional silane and an aryl acid halide of the type described, the structural strength and chemical deterioration resistance of the particulate solids are significantly increased. That is, the coated solids have greater structural strength properties when exposed to high loading pressure zone temperatures. The coated particulate solids also have greater resistance to deterioration when exposed to water or steam or a combination of water and steam brought about by hydrolysis, dissolution, physical erosion, etc. The coated solids have a greater resistance to alkaline pH deterioration associated with steam environments as well as to deterioration by contact with produced hydrocarbons. The coated solids have a greater resistance to crazing and/or fragmentation associated with shipping, handling and pumping after being suspended in carrier fluids. In addition, the coated particulate solids have higher structural strength when utilized as structural fillers in cement compositions, and the cured cement compositions have higher chemical resistance in high temperature, high pressure and alkaline pH environments.

Various techniques can be utilized in producing the high strength, chemical resistant particulate solids of this invention. For example, the particulate solid starting material utilized can be first coated with the aryl acid halide used followed by combining the organofunctional silane used with the coated solids. The reverse procedure can also be utilized, i.e., the particulate solid starting material can be first coated with the organofunctional silane followed by contact with the aryl acid halide. A preferred technique is to first coat the particulate solid starting material with the organofunctional silane in a convenient manner and then adding the silane coated solids to a solution of aryl acid halide in a solvent therefor. Particularly suitable solvents for aryl acid halides are kerosene and esters of phthalic acid such as diethyl phthalate. The acid halide is naturally extracted from the solvent and reacted with the silane. The solvent can then be liberated and separated from the treated solids and the coating cured by heating the coated solid to a temperature in the range of from about 350° F. to about 375° F. Once the coating on the particulate solid material cures, a dry coated particulate solid results which is very stable and can be stored in bags until used.

In carrying out the coating techniques described above, the quantity of organofunctional silane utilized to coat the particulate solid material varies depending upon the type and size of particulate solid material used and other factors, but generally, the quantity of silane required is in the range of from about 0.0005 gallon to about 0.002 gallon of silane per pound of particulate solid material. The quantity of aryl acid halide required to form the reaction product coating is generally in the range of from about 0.00015 to about 0.002 gallon aryl acid halide per gallon of silane used.

In carrying out the methods of treating subterranean zones penetrated by well bores wherein particulate solids are placed in the zones and thereby subjected to structural and chemical deterioration, the structural strength and chemical resistance of the particulate solids are first increased by coating the particulate solids with the reaction product of an organofunctional silane and an aryl acid halide as described above. The resulting coated solids of high strength and chemical deterioration resistance are then placed in the subterranean zones either directly in carrier fluids, or as components of treating fluids, cement compositions, etc.

In methods of fracture stimulating the production of hydrocarbon fluids from subterranean formations penetrated by well bores, fracturing fluids are first introduced into the formations by way of the well bores under conditions such that fractures are formed in the formations. Subsequently, particulate propping agents are placed in the fractures to prevent the fractures from closing, the particulate propping agents being comprised of particulate solids coated with the reaction product of organofunctional silanes and aryl acid halides as described above.

The high strength, chemical resistant particulate solid product of the present invention can be utilized in other subterranean zone or formation treating methods and procedures as well as in other applications where high strength and/or chemical deterioration resistant particulate solids are required.

In order to further illustrate and facilitate a clear understanding of the methods and particulate solids product of the present invention, the following examples are provided.

EXAMPLE 1

Figure 2:
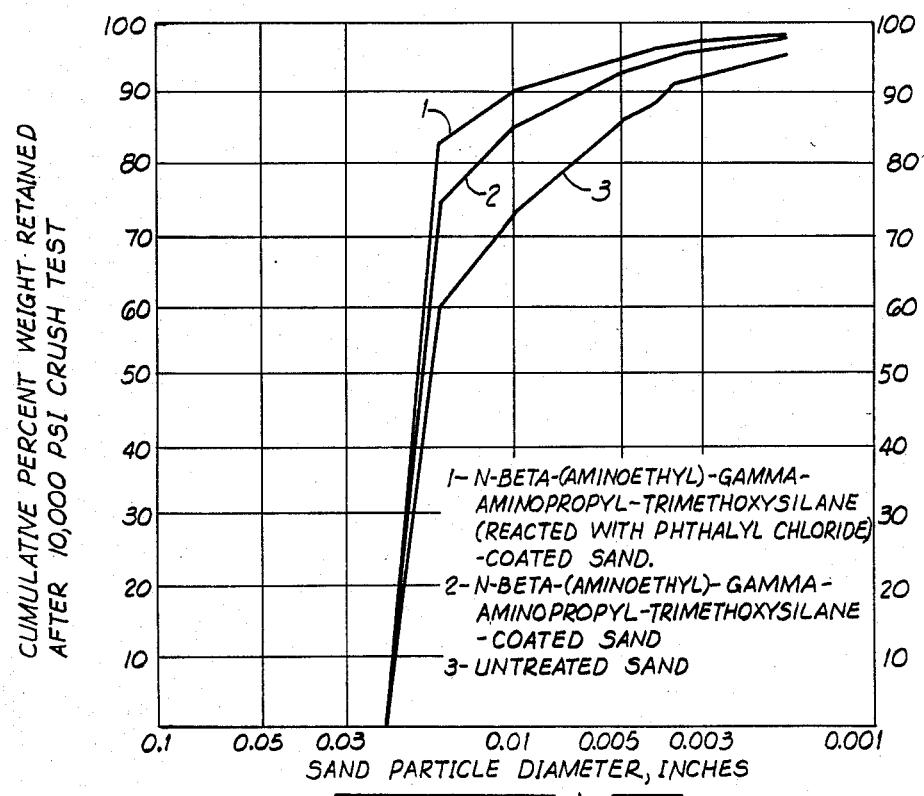
FIG. 2 is a graph showing additional results of 10,000 psi crush tests on sand treated in accordance with the methods of the present invention as compared to other sands.

To 200 grams of 20-40 mesh Unimin sand are added one cc phthaloyl chloride. After thorough mixing to cause wetting of each sand grain, three cc of N-beta-(aminoethyl)-gamma-amino-propyltrimethoxysilane are added to the mixture. Upon stirring of the solids for 2-3 minutes, a very tacky product forms which causes the sand grains to stick tenaciously together. Stirring is continued until the product begins to harden. With continued stirring during the hardening process, the coated sand grains are essentially all separate and discrete when stirring is stopped. The remaining small agglomerates of sand masses can easily be broken up by hand. Subsequently, the coated sand is placed in a circulating air oven at 350° F.-375° F. for one hour. At this time, the solids are removed and cooled down. Under the microscope the sand grains appear completely coated (light yellow coating) which appears to be glazed (very smooth) on the surface. After the solids are sieved to collect only the 20-40 mesh portion (this fraction appears to be over 99% of the total sample), an API crush test (10,000 psi for two minutes) is run on 40 grams of the sand. The crushed sand is sieved and the data obtained is presented in FIGS. 1 and 2. As shown, sand treated in accordance with the present invention is more crush-resistant at 10,000 psi than untreated sand and sand treated with the same silane but not reacted with an aryl acid halide.

EXAMPLE 2

The reaction product of phthaloyl chloride and Union Carbide A186 (beta-3-4 epoxycyclohexyl)-ethyltrimethoxysilane is evaluated. This test involves the addition of 2 cc of A-186 silane with 3 cc phthaloyl chloride. To this is added 100 grams of Oklahoma #1 sand. Upon stirring the mixture for two to three minutes, it is observed that the chemical coating begins to become more viscous (tacky). This mixture is left standing for several hours at room temperature. During this time it becomes fully consolidated. Pieces of the consolidated mass are found very resistant to deterioration by boiling in (1) standard brine, (2) fresh water, (3) 15% HCl, (4) 200° F. kerosene, and (5) 200° F. 5% NaOH solution.

EXAMPLE 3

The sand coating procedure of Example 1 is repeated using amytriethoxysilane, gamma-aminopropyltriethoxysilane and N-beta-(aminoethyl)-gamma-aminopropyltriethoxysilane reacted with phthaloyl chloride and N-beta-(aminoethyl)-gamma-aminopropyltriethoxysilane reacted with stearoyl chloride. The resulting coated sand samples are observed for tackiness and cohesion of particles. The results of these tests are given in Table I below.

TABLE I

Reactivity of Acid Chlorides with Different Silanes on Sand

| Silane | Aryl Acid Chloride | Observations |
| --- | --- | --- |
| Amytriethyoxysilane | Phthaloyl Chloride | No tackiness or cohesion of particles |
| Gamma-aminopropyltriethoxysilane | Phthaloyl Chloride | Moderate tackiness of reaction product and cohesion of parles ticles |
| N—beta-(aminoethyl)-gamma-aminopropyltriethoxysilane | Phthaloyl Chloride | Extremely tacky reaction product - very rapid in developing. Particles begin sticking together within 2 minutes |
| N—beta-(aminoethyl)-gamma-aminopropyltriethoxysilane | Stearoyl Chloride | Little or no tackiness or cohesiveness between sand grains |

As shown, because amytriethoxysilane does not include a polar functional group, it does not react with phthaloyl chloride. In addition, stearoyl chloride containing only one acid chloride group reacts only slightly with the silane showing the need for more than one acid chloride group per acid chloride-containing molecule to bring about a crosslinked polymeric network.

What is claimed is:

1. In a method of treating a subterranean zone penetrated by a well bore wherein a particulate solid is placed in the zone and thereby subjected to structural and chemical deterioration, which comprises increasing the structural strength and chemical resistance of said particulate solid prior to placement by coating said particulate solid with the reaction product produced by the reaction of an organofunctional silane comprising at least one member selected from the group consisting of aminofunctional silanes, ureidofunctional silanes and epoxyfunctional silanes, present in an amount of from about 0.0005 to about 0.002 gallon per pound of said solids, and an aryl acid halide, present in an amount of from about 0.00015 to about 0.002 gallon per gallon of said silane.

2. The method of claim 1 wherein said organofunctional silane is N-beta-(aminoethyl)-gamma-aminopropyltrimethoxysilane and said aryl acid halide is phthaloyl chloride.

3. The method of claim 1 wherein the treating of said subterranean formation penetrated by a well bore comprises the steps of:

introducing a fracturing fluid into said formation by way of said well bore under conditions such that one or more fractures are formed in said formation; and placing said propping agent comprised of particulate solids coated with the reaction product of an organofunctional silane and an aryl acid halide in said one or more fractures to prevent said fractures from closing.

4. The method of claim 3 wherein said propping agent is sand.

5. The method of claim 3 wherein said organofunctional silane is selected from the group consisting of gamma-aminopropyltriethoxysilane, N-beta-(aminoethyl)-gamma-aminopropyltrimethoxysilanes, aminoethyl-N-beta-(aminoethyl)-gamma-aminopropyl-trimethoxysilanes, gamma-ureidopropyl-triethoxysilanes, beta-(3-4 epoxy-cyclohexyl)-ethyl-trimethoxysilane, and gamma-glycidoxypropyltrimethoxysilanes.

6. The method of claim 3 wherein said aryl acid halide is selected from the group consisting of phthaloyl chloride, isophthaloyl chloride and terphthaloyl chloride.

* * * * *